United States Patent [19]

Itakura et al.

[11] Patent Number: 4,886,093

[45] Date of Patent: Dec. 12, 1989

[54] VENT VALVE OF AN AIR PUMP

[75] Inventors: Tsuyoshi Itakura, Tokyo, Japan; Allan H. Willinger, Oakland, N.J.

[73] Assignees: Itakura Soki, Tokyo, Japan; Brothers, Inc. Willinger, Oakland, N.J.

[21] Appl. No.: 287,403

[22] Filed: Dec. 20, 1988

[51] Int. Cl.⁴ .................................................. F16K 15/14
[52] U.S. Cl. .................................................. 137/855
[58] Field of Search ............... 137/855, 856, 857, 858; 417/413

[56] References Cited

U.S. PATENT DOCUMENTS

| | | | |
|---|---|---|---|
| 3,825,374 | 7/1974 | Kondo | 417/413 |
| 4,099,544 | 7/1978 | Itakura | 137/856 |
| 4,642,037 | 2/1987 | Fritchman | 137/856 X |
| 4,764,091 | 8/1988 | Ikeda | 137/855 X |
| 4,781,540 | 11/1988 | Ikeda | 137/855 X |

FOREIGN PATENT DOCUMENTS 891313 3/1962 United Kingdom ................ 137/855

Primary Examiner—Robert G. Nilson
Attorney, Agent, or Firm—Helfgott & Karas

[57] ABSTRACT

A vent valve of an air pump typically utilized in an aquarium apparatus. The vent valve includes a wall member with a vent hole in the wall member. A valve body having a flap member closes onto the vent hole. The closure action of the flap member is regulated so that the flap is twisted under the force of air flowing through the vent hole in a direction toward the flap member and returns to a closed position against the wall member with a rolling sidewise fold-down motion when an air flow lessens. In this manner, there is a reduction in the flapping noise of the valve.

20 Claims, 3 Drawing Sheets

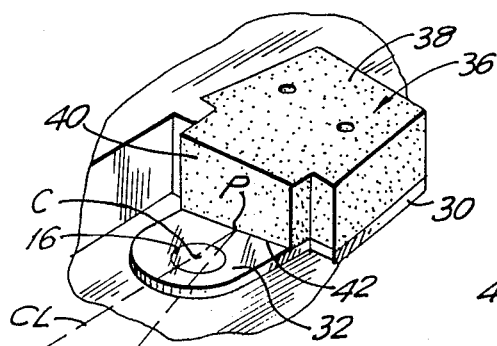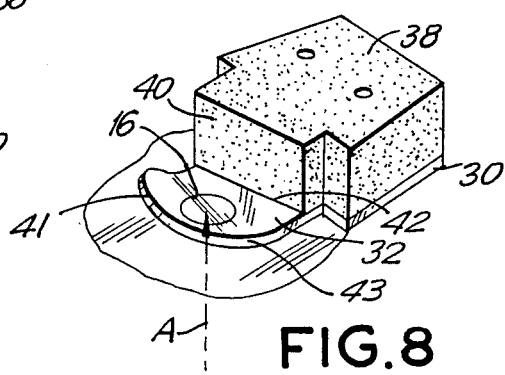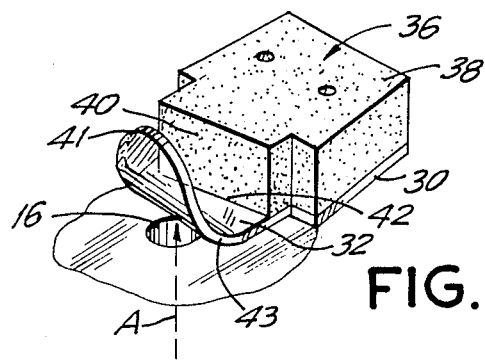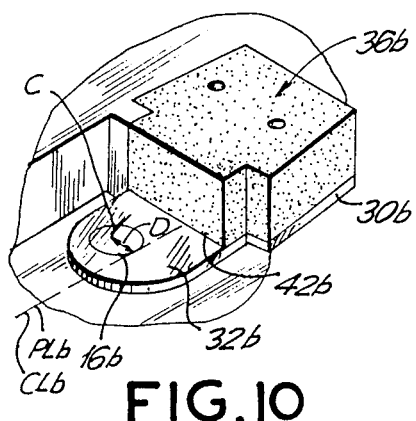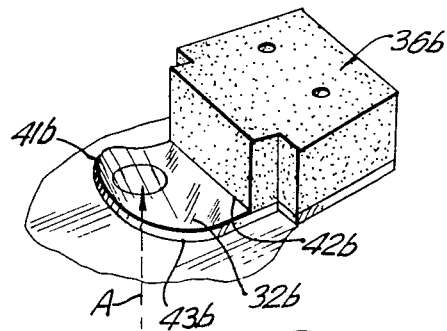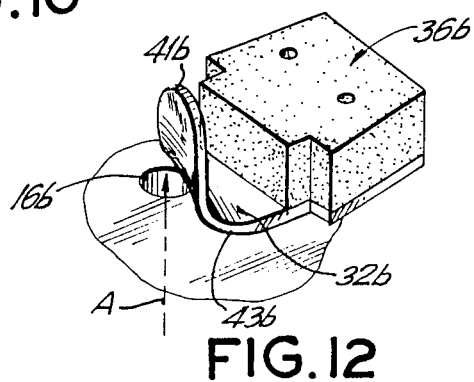

VENT VALVE OF AN AIR PUMP

This invention relates to a vent valve for an air pump, and more particularly to a vent valve for an air pump used to feed air into an aquarium filter or a fish tank.

BACKGROUND OF THE INVENTION

In typical air pumps used in conjunction with aquarium apparatus, a vibrating membrane drives air toward a separator wall dividing the main body of the pump into inner and outer chambers. The separator wall contains a vent valve which comprises a vent hole covered by a flexible valve body which flexes to open and close the vent hole under the force of the vibrating air column. Such vent valves are, for example, described in U.S. Pat. No. 4,099,544 granted to Itakura et al on July 11, 1978.

The valve body of such vent valves typically has a guitar-like shape with a larger rounded base section fixed in a correspondingly shaped seat in the separator wall and connected to a smaller rounded deflectable tongue section which centrally covers the vent hole. A plug member which fixedly retains the larger base section within the seat in the separator wall, has a straight distal edge extending transversely between the base section and the tongue section, against and along which edge the tongue section flexes to open and close the vent hole.

With this guitar-like shape constitution, and specifically the rounded base section, the base can rotate or laterally shift within its seat. Particular care must be taken to properly orient the position of the vent body in its seat on the separator wall so that the tongue section covers the vent hole at all times. Moreover, the flexure of the tongue section toward and away from the separator wall causes a flapping sound as the tongue section strikes the wall upon each closure of the valve. This sound tends to produce a noisy pump and reduces the pleasing effect of the aquarium tank.

Accordingly, it is an object of the present invention to provide a vent valve of an air pump for a fish tank which is virtually noiseless during operation.

Another object is to provide a construction for such vent valve which permits an easy and definitive desired orientation of the valve body relative to the vent hole.

SUMMARY OF THE INVENTION

In accordance with the present invention, a thin, flat flexible valve body member, preferably made of silicone rubber, includes a base section, a tongue section and an intermediate connecting section which are symmetrically shaped along both sides of a center line. The valve body is seated within a correspondingly shaped recess in a separator wall of the pump so that the tongue section covers a vent hole in the wall. A rubber plug fits within a portion of the recess and retains the base section of the valve body against the separator wall. The plug has a straight distal edge which extends across the connecting section of the valve body. The tongue section flexes away from the separator wall against and along the plug's straight distal edge when air is fed through the vent hole toward the tongue.

In accordance with an important aspect of the present invention, the vent hole is eccentrically located on the separator wall relative to the flexure direction enforced by the plug's straight distal edge. This flexure direction is defined by a line perpendicular to the straight distal edge at its intersection with the centerline of the valve body. The eccentric location of the vent hole causes the tongue to be flexed along the straight distal edge with a twisting motion as the valve is opened under the force of the air flowing through the vent hole. Because of this twisted motion, the tongue section returns to its closed position against the separator wall with a rolling sidewise fold-down motion, thereby virtually eliminating the sound of the valve closure. Such flapping sound normally occurs in the present device when the tongue section is concentrically arranged relative to the vent hole along a center line of the valve body perpendicular to the deflection edge and the tongue section flaps down against the separator wall during each valve closure.

The eccentric location of the tongue section may be achieved by locating the vent hole along the center line of the valve body but extending the straight distal edge of the plug across the connecting section, at an angle non-perpendicular to the center line. Alternatively, the eccentric location can be achieved by extending the straight distal edge of the plug perpendicular to the center line but locating the vent hole at an offset location from the center line.

In accordance with a further feature of the present invention, the base section of the valve body member has four angular corners which fit snugly within and against the walls of a correspondingly shaped recess in the separator wall. By this construction, the desired directional orientation of the valve body member is assured without the possibility of rotation within the recess, and may be quickly and easily achieved when the valve body member is seated within its recess.

BRIEF DESCRIPTION OF THE DRAWINGS

The novel features of the invention are set forth in the appended claims. The invention itself, together with further objects and advantages thereof, can best be understood by reference to the following description taken in conjunction with the accompanying drawings in which:

FIGS. 7, 8 and 9 are similar perspective views of the vent valve of the present invention showing the valve closed (FIG. 7) partially open (FIG. 8) and fully open (FIG. 9) positions, and FIG. 10, 11 and 12 are similar perspective views of a second embodiment of the vent valve of the present invention showing the valve in closed (FIG. 10), partially open (FIG. 11) and fully open (FIG. 12) positions.

In the various figures of the drawing, like parts are indicated by like reference numerals.

DESCRIPTION OF THE PREFERRED EMBODIMENT

Figure 1:
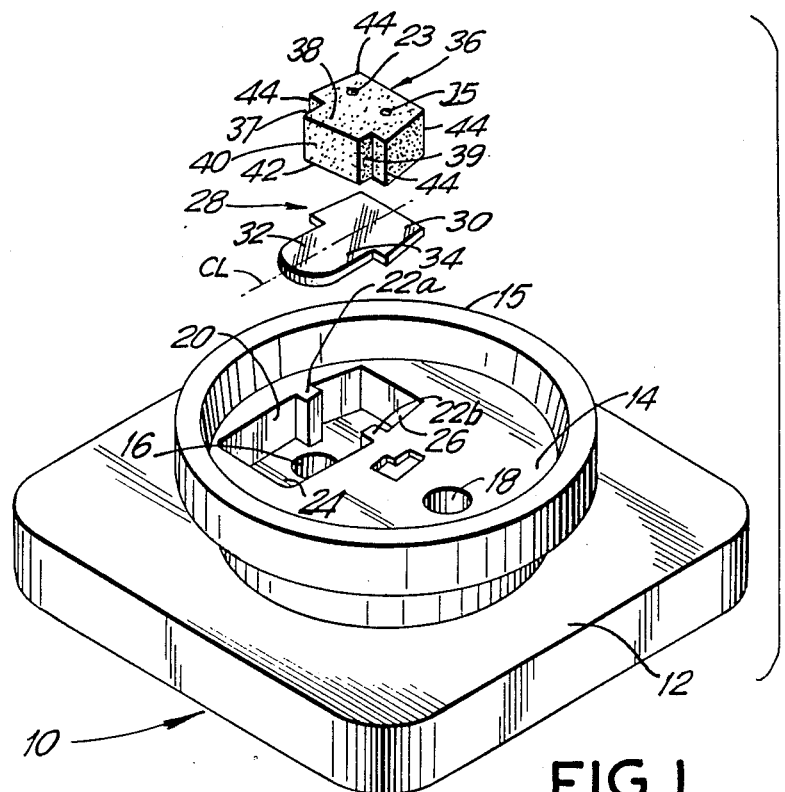
FIG. 1 is an exploded perspective view of a separator wall and parts of the vent valve embodying the invention prior to assembly within a recess in the separator wall.

Referring to FIG. 1, in accordance with the present invention, a separator wall 10 of an air pump (not shown) has a supporting perimeter flange 12 and an upstanding thickened circular central region 14 containing a pair of spaced vent holes 16 and 18 and surrounded by an upstanding peripheral wall 15. Separator wall 10 is preferably made of molded hard plastic material and serves to divide the air pump into inner and outer chambers, part of which is shown respectively at 17 and 19. Vent hole 16 serves to admit air into the inner chamber in one direction, while vent hole 18 serves to exhaust air from the inner chamber in the opposite direction. Such operation occurs under the force of a vibrating air column produced by a driven diaphragm which may be typically operated by an electromagnet. An elongated recess 20, divided by opposing ridges 22 into two regions 24, 26, extends within the upper side of the central thickened region 14 of separator wall 10. Vent hole 16 opens into one section 24 of this recess from the under side of separator wall 10. A similar recess (not shown) extends within the underside of this central thickened region 14 parallel to recess 20 and communicates with vent hole 18.

A thin flat flexible valve body member 28, preferably made of silicone rubber, is shaped to fit within recess 20 and includes a base section 30, a tongue section 32, and an intermediate connecting section 34, which are symmetrically shaped on both sides of a center line CL. When fully seated within recess 20, base section 30 of valve body member 28 fits within recess region 26, and tongue section 32 overlaps vent hole 16 within recess region 24. Valve body member 28 is firmly held in place against separator wall 10 within recess 20 by a rubber plug 36 inserted within recess region 26 over the base section 30 and onto connecting section 34 of valve body member 28. Plug 36 is shaped to conform to, and fit snugly against, the side walls which define this recess region 26. Plug 36 has a forward extension region 38 which fits between and extends slightly beyond opposing ridges 22 within recess 20 and overlaps the connecting section 34 of valve body 28. A pair of small holes 23, 25 are provided for ease of extraction of the plug in order to replace the valve when necessary.

In accordance with one embodiment of the invention described in connection with FIGS. 1-3 and 7-9, one side 37 of extension region 38 abutting one ridge 22a is slightly longer than the opposite side 39 thereof abutting the opposing ridge 22. The front flat face 40 constituting the distal edge of plug 36 therefore extends across recess 20 at a slight angle away from a plane perpendicular to the centerline CL of the valve body member 28. The bottom edge of this front face 40 forms a straight flexure edge 42 against and along which the tongue section 32 of valve body member 28 flexes under the force of air flowing upward through vent hole 16. This bottom straight flexure edge 42 of front face 40 of plug 36 likewise extends transversely across recess 20 at an angle which is not perpendicular to the centerline CL of the valve body member 28. On the other hand, the vent hole 16 is centered between the opposing walls of recess 20 so that the center C of hole 16 lies on the centerline CL.

As best seen in FIG. 7, because of this nonperpendicular orientation of the flexure edge 42, the vent hole center C is offset from a line PL perpendicular to the flexure edge 42 at the point P at intersection with the centerline CL. This line PL represents the flexure direction of the flexure edge 42 of plug 36, and the vent hole 16 may thus be considered to be eccentrically located relative to this flexure edge 42.

Figure 4:
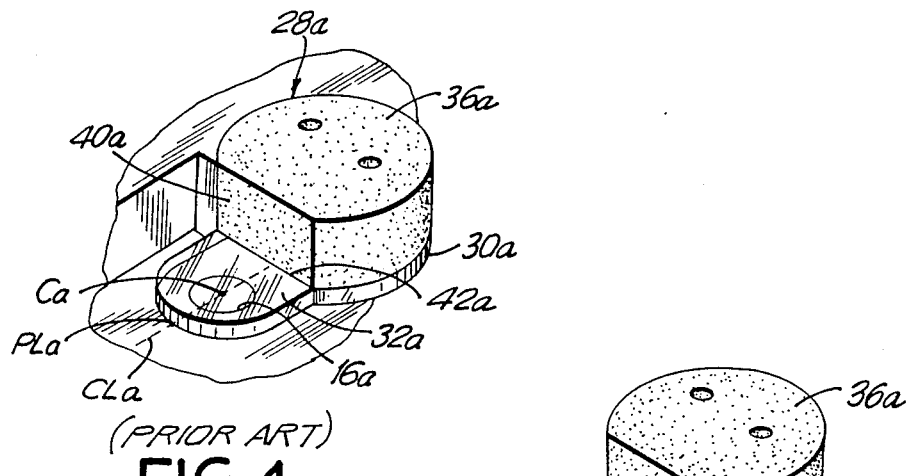
FIGS. 4, 5 and 6 are perspective views of a prior art vent valve respectively showing the valve in closed (FIG. 4), partially open (FIG. 5) and fully open (FIG. 6) positions.
Figure 5:
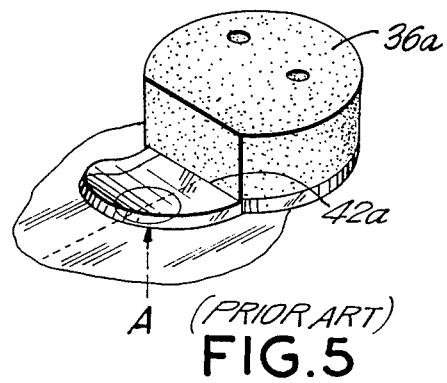
Figure 6:
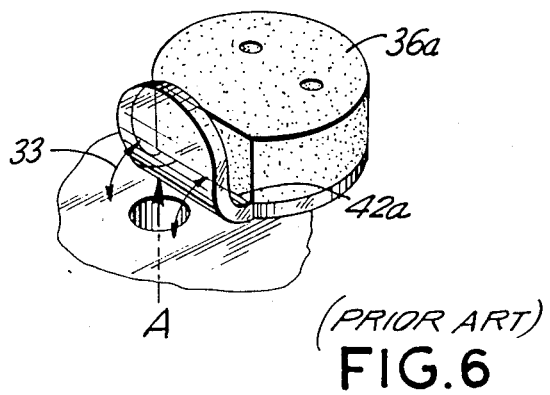

The eccentric orientation of the vent hole 16 relative to the flexure edge 42 of plug 36 is to be contrasted with the prior art orientation, shown in FIGS. 4-6, wherein a vent hole 16a is centrally located relative to the flexure edge 42a. In the prior art arrangement, the front face 40a of a plug 36a, together with its bottom flexure edge 42a, extends transversely perpendicular to the centerline CLa of the valve body member 28a so that the center Ca of vent hole 16a falls along a line PLa perpendicular to the flexure edge 42a and coinciding with centerline CLa.

The operation of this prior art valve is illustrated in FIGS. 4-6. In FIG. 4 the prior art valve is shown in its normally closed position with tongue section 32a of valve body member 28a overlying and closing the vent hole 16a. As previously described, vent hole 16a is centrally oriented relative to tongue section 32a and the flexure edge 42a.

In FIG. 5, the prior art vent valve is shown with tongue section 32a deflected partially open under the force of an air stream in the direction of arrow A, while in FIG. 6 the tongue section 32a is shown deflected fully open by this air stream. Throughout this deflection, the tongue section 32a remains in planes parallel to the flexure edge 42a and flexes along arcs 33 in planes parallel to the air stream. There is thus a single axis of deflection with no twist or deformation of the tongue section 32a other than along this deflection axis.

As a consequence, all parts of the tongue section 32a equidistant from the deflection axis move between open and closed positions simultaneously, and a "flapping" of the tongue section 32a against the separation wall 10 results each time the valve closes as the air stream reverses under the vibration of the air pump diaphragm.

Figure 2:
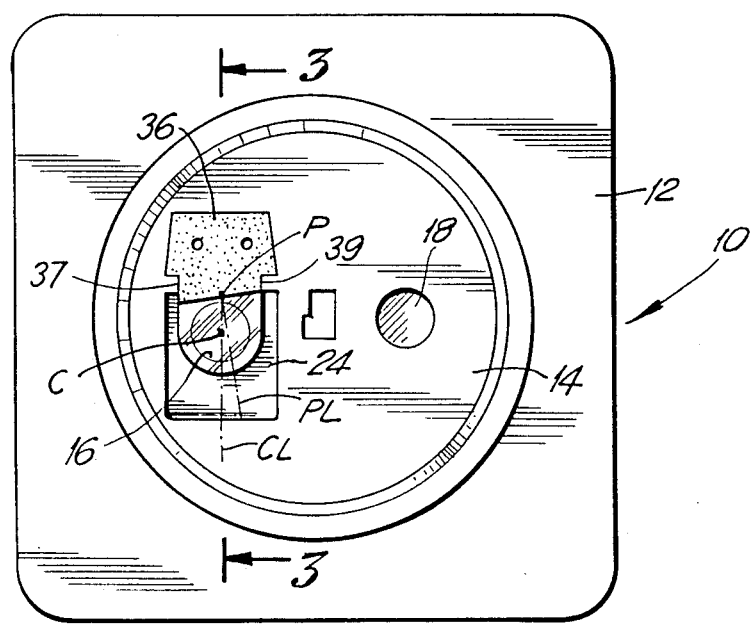
FIG. 2 is a plan view of the separator wall and vent valve after assembly.
Figure 3:
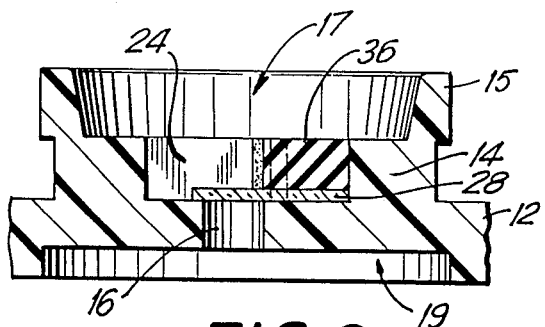
FIG. 3 is a cross-section of the separator wall and valve taken along line 3—3 of FIG. 2.

In contrast thereto, the operation of the vent valve of the present invention as was shown in FIGS. 1-3 is shown in FIGS. 7-9. In FIG. 7, tongue section 32 overlies and closes the vent hole 16, and the center C of vent hole 16 is located along center line CL but is offset from the line PL perpendicular to flexure edge 42 at its intersection P with centerline CL.

The effect of an upward air stream upon the flexure of tongue section 32 is shown in FIGS. 8 and 9. While the air pressure against the bottom surface of tongue section 32 produces components of force which tend to deflect the free end of the tongue along arcs in planes parallel to the centerline CL of the tongue, such movement is restricted and distorted by the non-perpendicular orientation of the flexure edge 42. Consequently, the tongue section 32 is twisted as it opens, with one side 41 of the tongue section being deflected to a greater degree than the other side thereof 43.

Thus, when the air stream lessens and then reverses direction, the tongue section 32 returns to its closed position against the separation wall 10 with a rolling sidewise fold-down motion in which areas of the tongue section remote from the air stream successively reach the separator wall as they approach the locus of the air stream. This rolling sidewise fold-down movement is virtually noiseless, and the "flapping" sound of the prior art construction is eliminated.

It will be appreciated that in such vent valves it is important accurately to maintain the orientation of the tongue section 32 relative to the vent hole 16. For this purpose, the base section 30 of the vent valve body member 28, as well as the retaining plug 36, are made with a shape which will avoid the possibility of rotation of the valve within the recess. In the embodiment shown, four angular corners 44 are provided to the base section 30, for greater stability, both base section 30 and the overlying portion of the retaining plug 36 are trapezoidal in shape with the longer side of the trapezoid abutting the opposing ridges 22, thereby further stabilizing the entire assembly. The walls of recess section 26 are shaped to fit contiguously around and to retain this four cornered base section 30 against lateral movement. This construction is considerably more stable, and the orientation of the tongue section relative to the vent hole 16 more accurate, than the prior art construction of FIG. 4-6, wherein the base section 30a of the valve body member 28a, as well as the retaining plug 36a have rounded shapes which make it more difficult to assemble and which permit some radial shifting of the valve body member over time.

Referring now to FIGS. 10-12 there is shown another embodiment of the invention wherein the eccentric location of the vent hole relative to the flexure edge is achieved by locating the vent hole in a position offset from the centerline of the valve body member rather than by a non-perpendicular orientation of the flexure edge.

As shown in FIG. 10, the flexure edge 42b remains perpendicular to the centerline CLb of tongue section 32b of valve body member 28b, but the center Cb of vent hole 16b is offset by a distance D from this centerline CLb, which thus also coincides with the line PLb perpendicular to the flexure edge 42b.

The vent hole 16b remains completely covered by the tongue section 32b in the closed position of the valve. Because of the offset location of the vent hole 16b, the part 41b of the tongue section overlying the vent hole is deflected to a greater degree than the remaining remote parts 43b of the tongue section. Therefore, the tongue section and is twisted in a manner similar to the embodiment of FIGS. 7-9 as it is flexed along and against the flexure edge 42b under the force of the air stream. During closure of the valve, the portions of tongue section remote from the vent hole successively reach the separation wall as they approach the location of the vent hole. This results in the same virtually noiseless sideways rolling fold-down motion of the tongue section 32b during closure.

In both the embodiment of FIGS. 1-3 and 10-12, the respective valve body members 28 and 28b may typically be made of a flat strip of silicone rubber. The flexure edge 42 may conveniently be oriented at an angle of up to about 45° away from a line perpendicular to the centerline CL. In the embodiment shown, the angle is preferably about 7°. In the embodiment of FIGS. 10-12, the center Cb of the vent hole may be offset by at least a diameter of the vent hole from the centerline CLb.

While specific embodiments of the invention have been described above, many modifications can be made, and it is intended by the appended claims to cover all such modifications as fall within the scope and general connotation of the terms thereof.

We claim:

1. A vent valve of an aquarium air pump comprising a thin flat flexible valve body member having a base section, a tongue section and an intermediate connecting section, a separator wall dividing the pump into two chambers, said wall having a recess within which said valve body member is seated and having a vent hole opening into said recess in communication with a portion of said tongue section, a plug retained within said recess against said base section, said plug having a straight edge thereof extending transversely across the surface of said connecting section against and along which edge said tongue section is flexed to an open valve position when air flows through said vent hole in a direction toward said tongue section, said vent hole being eccentrically located relative to the direction of flexure enforced by said straight edge, whereby said tongue section is flexed open in a twisting manner under the force of said air flow and returns to its closed position against said separator wall with a rolling sidewise fold-down motion when said air flow lessens.

2. The vent valve of claim 1 wherein the valve body member is made of silicone rubber.

3. The vent valve of claim 1 wherein said tongue section and said connecting section are symmetrically shaped on both sides of a centerline, said direction of flexure is defined by a line perpendicular to said straight edge at its intersection with said centerline, and the center of said vent hole is offset from said perpendicular line.

4. The vent valve of claim 3 wherein said vent hole center is located along said centerline, and said straight edge is non-perpendicular to said centerline.

5. The vent valve of claim 3 wherein said line perpendicular to said straight edge coincides with said centerline, and said vent hole is offset from said centerline.

6. The vent valve of claim 1 wherein said base section comprises locking means for preventing rotation of said valve body member within said recess.

7. The vent valve of claim 1 wherein said base section has at least four corners, and the recess in said separator wall has walls shaped to fit contiguously around and to retain said four cornered base section against lateral movement.

8. The vent valve of claim 7 wherein said base section has a trapezoidal shape with the larger base line of the trapezoid abutting said connecting section of said valve body member.

9. A vent valve of an air pump comprising a wall member, a vent hole in said wall member, a valve body having a flap member for closing onto said vent hole, and means for regulating the closure action of said flap member onto said vent hole so that said flap is twisted under the force of air flowing through said vent hole in a direction towards said flap member and returns to a closed wall position thereof against said wall member with a rolling sidewise fold-down motion when an airflow lessens.

10. A vent valve as in claim 9, wherein said flap member and said vent hole are asymmetric with respect to each other.

11. A vent valve as in claim 10 wherein said flap member is symmetric with respect to a center line therethrough, and wherein said vent hole is offset from said center line .

12. A vent valve as in claim 9 and further comprising a restraining member transversely positioned across said valve body , said restraining member including an edge forming a line of flexure for said flap member, and wherein said line of flexure is angled across said valve body.

13. A vent valve as in claim 12 wherein said valve body is symmetric along a center line thereof, said vent hole has a center lying along said center line, and wherein said line of flexure is non-perpendicular with respect to said center line.

14. A vent valve as in claim 9 wherein a recess is provided in said wall member for receiving said valve body, and further comprising a plug member for retaining said valve body secured in such recess, said plug member forming said restraining member.

15. A vent valve of an aquarium air pump comprising a thin flat flexible valve body member having a base section, a tongue section and an intermediate connecting section, a separator wall dividing the pump into two chambers, said wall having a recess within which said valve body member is seated and having a vent hole opening into said recess in communication with a portion of said tongue section, a plug retained within said recess against said base section, said plug having an edge thereof extending transversely across the surface of said connecting section along which edge said tongue section is flexed to an open valve position so that when air flows through said vent hole in a direction toward said tongue section said tongue section is twisted under the force of air flowing through said vent hole and then returns to a closed position thereof against said separator wall with a rolling sidewise fold-down motion when said air flow lessens, and locking means for preventing rotation of said valve body member within said recess.

16. The vent valve of claim 15 wherein said base section has at least four corners, and the recess in said separator wall has walls shaped to fit contiguously around and to retain said four cornered base section against lateral movement.

17. The vent valve of claim 16 wherein said base section has a trapezoidal shape with the larger base line of the trapezoid abutting said connecting section of said valve body member.

18. A vent valve of an air pump comprising a wall member, a vent hole in said wall member, a valve body having a flap member for closing onto said vent hole, means for regulating the closure action of said flap member onto said vent hole into a gradual fold down motion, and a restraining member transversely positioned across said valve body, said restraining member including an edge forming a line of flexure for said flap member, and wherein said line of flexure is angled across said valve body, said valve body being symmetric along a center line thereof, said vent hole having a center lying along said center line, and wherein said line of flexure is non-perpendicular with respect to said center line.

19. A vent valve of an aquarium air pump comprising a thin flat flexible valve body member having a base section, a tongue section and an intermediate connecting section, a separator wall dividing the pump into two chambers, said wall having a recess within which said valve body member is seated and having a vent hole opening into said recess in communication with a portion of said tongue section, a plug retained within said recess against said base section, said plug having an edge thereof extending transversely across the surface of said connecting section along which edge said tongue section is flexed to an open valve position when air flows through said vent hole in a direction toward said tongue section, and locking means for preventing rotation of said valve body member within said recess, wherein said base section has at least four corners, and the recess in said separator wall has walls shaped to fit continuously around and to retain said four cornered base section against lateral movement.

20. The vent valve of claim 19, wherein said base section has a trapezoidal shape with the larger base line of the trapezoid abutting said connecting section of said valve body member.

* * * * *